Patented Jan. 20, 1931

1,789,873

UNITED STATES PATENT OFFICE

HANS LECHER, OF LEVERKUSEN, AND ALBERT KOCH, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

POLYMERIZATION OF BUTADIENE HYDROCARBONS

No Drawing. Application filed March 7, 1929, Serial No. 345,216, and in Germany March 10, 1928.

The present invention relates to an improvement in the polymerization of butadiene hydrocarbons in emulsion with water and emulsifying agents.

Several methods are known to polymerize butadiene hydrocarbons, such as butadiene-(1.3), isoprene, 2.3-dimethylbutadiene-(1.3), and the like, in emulsions, that means by emulsifying the hydrocarbon with suitable emulsifying agents, such as aqueous solutions of soaps, salts of bile acids, salts of alkylated naphthalene sulfonic acids and the like, and causing polymerization to take place by shaking or stirring these emulsions, if desired while gently heating. These methods as they have been handled up to date have the disadvantage that it is rather difficult to get emulsions giving nearly quantitative yields of polymerization products.

Now we have found that this disadvantage can easily be overcome by subjecting the emulsions before the polymerization to a homogenizing process, for instance by forcing the emulsions through small apertures according to usual methods. By this homogenizing process most finely dispersed, uniform and stable emulsions are obtainable, polymerization of which will perform much quicker and in a far better yield than that of the corresponding not homogenized emulsions.

The following examples illustrate our invention without limiting it thereto, the parts being by weight:—

*Example 1.*—50 parts of isoprene are emulsified in 100 parts of an aqueous solution of sodium oleate of 10% strength while shaking or stirring. The emulsion thus obtained is pressed through plates of sintered glass, whereby the emulsified hydrocarbon particles become exceedingly finely dispersed. Polymerization is then caused by heating the homogenized emulsion to about 60° C. while shaking. After a short time a latex like emulsion has formed yielding a rubber like mass by coagulation according to any desired method.

*Example 2.*—60 parts of butadiene-(1.3), 100 parts of an aqueous solution of sodium oleate of 10% strength and 2 parts of 1/1 n. caustic soda lye are emulsified in a closed vessel by shaking. The unstable, not uniform emulsion thus obtainable is then homogenized in a homogenizer according to D. R. P. 163372 (W. G. Schroeder Nachf. in Lubeck). Polymerization of the homogenized and stable emulsion thus obtained is performed by heating it without movement to about 60° C. for about 2 days. A latex like cream is thus obtained in a quantitative yield from which a coagulate may be produced for instance by acidifying.

*Example 3.*—50 parts of butadiene-(1.3), 50 parts of benzene, 2 parts of 1/1 n. caustic soda lye and 200 parts of an aqueous solution of sodium stearate of 5% strength are emulsified in a closed vessel while shaking and gently heating. The emulsion is homogenized in a homogenizer and polymerization is caused by heating the homogenized emulsion to 60° C. for about 3 days. From the latex like cream thus obtained the benzene is removed after coagulation by distillation or extraction. The yield of polymerizate is considerably higher than that obtainable from the same but not homogenized emulsion.

*Example 4.*—A mixture of 50 parts of butadiene-(1.3) and 30 parts of 2.3-dimethylbutadiene-(1.3) are emulsified in 150 parts of an aqueous solution of sodium oleate of 10% strength and 4 parts of 1/1 n. caustic soda lye according to Example 2, homogenized and polymerized. A rubber like polymerizate is thus obtained in a quantitative yield.

We claim:—

1. In the process of ploymerizing a butadiene hydrocarbon in emulsion with water and an emulsifying agent, the step which comprises homogenizing the emulsion before polymerizing.

2. In the process of polymerizing a compound of the group consisting of butadiene-(1.3), isoprene and 2.3-dimethylbutadiene-(1.3), in emulsion with water and an emulsifying agent the step which comprises homogenizing the emulsion before polymerizing.

3. In the process of polymerizing a butadiene hydrocarbon in emulsion with water and an emulsifying agent, the step which comprises homogenizing the emulsion before polymerizing by forcing it through small apertures.

4. In the process of polymerizing a compound of the group consisting of butadiene-(1.3), isoprene and 2.3-dimethylbutadiene-(1.3) in emulsion with water and an emulsifying agent the step which comprises homogenizing the emulsion before polymerizing by forcing it through small apertures.

In testimony whereof we have hereto set our hands.

HANS LECHER. [L. S.]
ALBERT KOCH. [L. S.]

polymerizing by forcing it through small apertures.

4. In the process of polymerizing a compound of the group consisting of butadiene-(1.3), isoprene and 2.3-dimethylbutadiene-(1.3) in emulsion with water and an emulsifying agent the step which comprises homogenizing the emulsion before polymerizing by forcing it through small apertures.

In testimony whereof we have hereto set our hands.

HANS LECHER. [L. S.]
  ALBERT KOCH. [L. S.]

DISCLAIMER 1,789,873.—*Hans Lecher*, Leverkusen, and *Albert Koch*, Cologne-Deutz, Germany. POLYMERIZATION OF BUTADIENE HYDROCARBONS. Patent dated January 20, 1931. Disclaimer filed June 22, 1934, by the assignee, *I. G. Farbenindustrie Aktiengesellschaft*.

Therefore, enters this disclaimer to certain of the claims of the above identified patent, namely, claims 1 and 2.

[*Official Gazette July 24, 1934.*]

DISCLAIMER 1,789,873.—*Hans Lecher*, Leverkusen, and *Albert Koch*, Cologne-Deutz, Germany. POLYMERIZATION OF BUTADIENE HYDROCARBONS. Patent dated January 20, 1931. Disclaimer filed June 22, 1934, by the assignee, *I. G. Farbenindustrie Aktiengesellschaft*.

Therefore, enters this disclaimer to certain of the claims of the above identified patent, namely, claims 1 and 2.

[*Official Gazette July 24, 1934.*]